May 29, 1951        E. W. D'ARCY        2,554,666
MOTION-PICTURE CONDENSER LENS MOUNTING
Filed Nov. 30, 1950
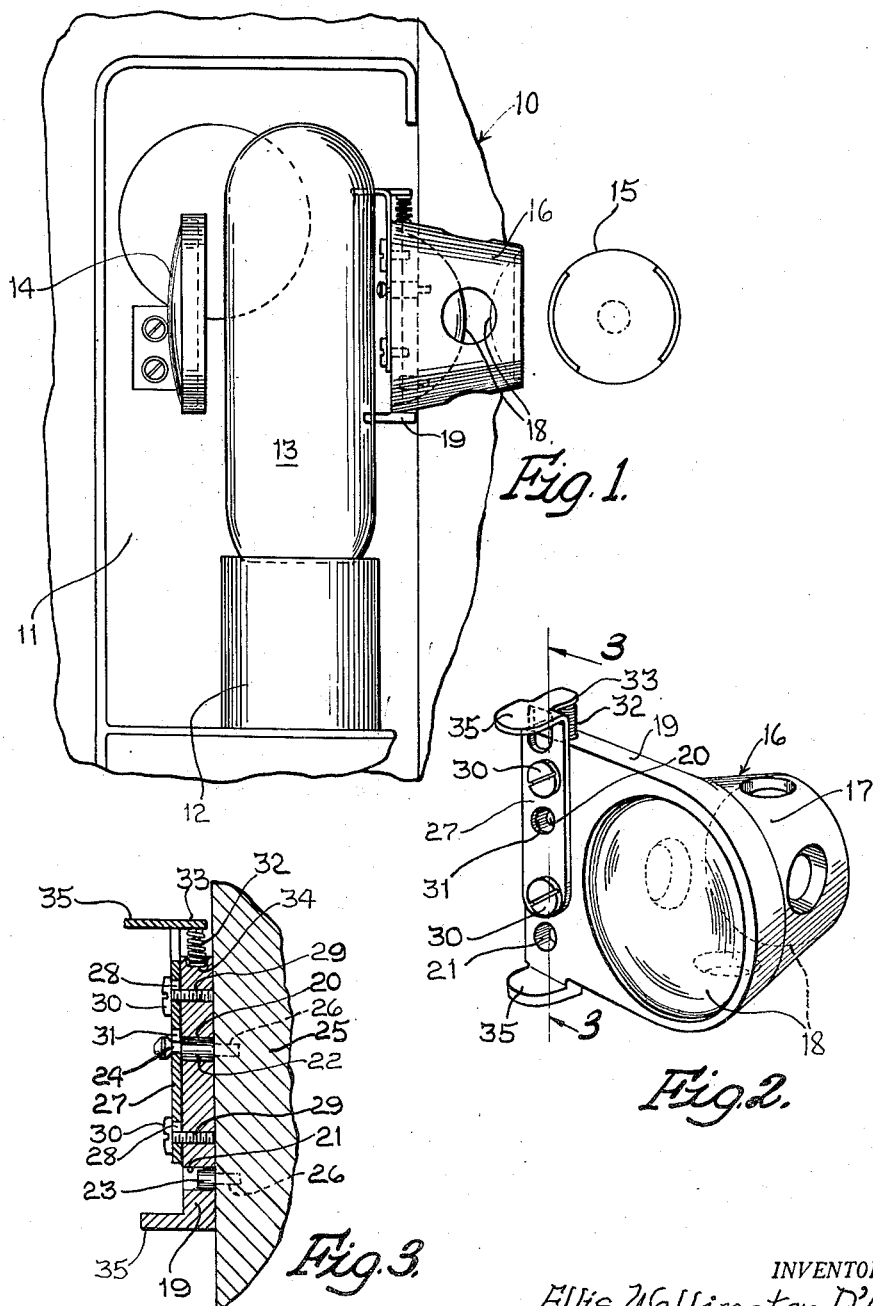
INVENTOR.
Ellis Wellington D'Arcy
BY Clarence E. Shrudy
His Attorney.

Patented May 29, 1951

2,554,666

UNITED STATES PATENT OFFICE 2,554,666

MOTION-PICTURE CONDENSER LENS MOUNTING

Ellis Wellington D'Arcy, Chicago, Ill., assignor to DeVry Corporation, Chicago, Ill., a corporation of Illinois Application November 30, 1950, Serial No. 198,398

2 Claims. (Cl. 88—57)

This invention relates to certain new and useful improvements in motion picture condenser lens mounting and has for its principal object the provision of an improved construction of this character which will be highly efficient in use and economical in manufacture.

Among the several other objects of the invention is the provision of a new and simple arrangement for mounting a condenser lens assembly, of a motion picture apparatus, between the lamp of the machine and a barrel shutter thereof in a manner such that without removing either the lamp or the shutter the lens assembly may be quickly and conveniently removed for replacement, repair or cleaning purposes.

Other objects will appear hereinafter.

The invention consists in the novel combination and arrangement of parts to be hereinafter described and claimed.

The invention will be best understood by reference to the accompanying drawings showing the prferred form of construction, and in which:

Fig. 1 is a fragmentary elevational view of a motion picture projection machine showing my improved condenser lens mounting associated therewith;

Fig. 2 is a perspective view of the condenser lens mounting removed from the machine; and Fig. 3 is a sectional detail view taken substantially on line 3—3 of Fig. 2.

Referring more particularly to the drawings, a motion picture apparatus is fragmentarily illustrated at 10. Such apparatus includes a lamp housing 11. This lamp housing 11 includes a cover. The cover has been omitted from the drawing to better illustrate the interior of the housing 11. In this housing is mounted a socket 12 which receives a lamp 13. To the rear of the lamp 13 is mounted a reflector 14. Forwardly of the lamp 13 and to the rear of the barrel shutter 15 is a condenser lens assembly 16. It is a mounting for this assembly with which my invention is concerned.

This assembly comprises a lens barrel 17 having mounted therein in the usual and conventional manner the condenser lenses 18.

The barrel 17 provides a plate 19 extending laterally from one side thereof. This plate 19 provides spaced openings 20 and 21, through which are adapted to project mounting pins 22 and 23. In the present structure, the mounting pin 22 is provided at its adjacent outer end with an angular groove 24. These pins are mounted in a wall 25 of the apparatus 10 by driving, screwing or forcing studs 26 thereof into suitable sockets formed in this wall.

Mounted for slidable movement over one surface of the plate 19 is a latch bar 27. This latch bar 27 is provided with spaced aligned elongated slots 28 through which the shanks 29 of screws 30 project. These screws and slots provide a slidable connection between the latch bar 27 and the plate 19. The latch bar 27 is provided with an opening 31 through which projects the head of the mounting pin 22.

A spring 32 is mounted between a lug 33 of the latch bar 27 and the plate 19 for yieldably holding the latch bar 27 in latched engagement in the groove 24 of the mounting pin 22. In the present structure, the spring 32 is seated in a socket 34 formed in the plate 19.

To complete the invention, the plate 19 and the latch bar 27 provide finger engaging lugs 35 to facilitate moving the latch bar 27 against the action of the spring 32.

In mounting the condenser lens assembly in position the pins 23 and 24 are projected into their respective openings to dispose the latch bar 27 in engagement with the head of the pin 22. By this arrangement the latch bar 27 and pin 22 cooperate to removably but firmly hold the lens assembly in its mounted position between the lamp 13 and the shutter 15. To remove the lens assembly it is only necessary to slide the latch bar 27 relative to the plate 19. This is accomplished by compressing the lugs 35 between the fingers of the hand whereby the latch bar 27 will be moved against the action of the spring 32 to unlatch the latch bar from the grooved head of the pin 22. This operation takes place without the necessity of disturbing either the lens 13 or the barrel shuttle 15.

The construction involves relatively few parts, can be economically manufactured and can be assembled with the minimum degree of labor.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A mounting for a condenser lens assembly comprising a lens barrel, a mounting pin on a picture projector apparatus for securing said mounting thereon, a plate at and lateral to one end of the barrel and provided with mounting pin receiving openings, a latch bar, means for mounting said bar for movement over a surface of the said plate, said latch bar having an opening adapted to register with one of the mounting pin openings when said latch bar is moved in one direction over said surface, and spring means between said plate and said latch bar for wedging the bar into latched engagement with a grooved head formed on said mounting pin projected into the opening of said latch bar, said latch bar at one end thereof and said plate at one edge thereof providing laterally extending finger lugs adapted to be grasped between the fingers of a hand to move the latch bar relative to said plate.

2. A mounting for a condenser lens assembly comprising a lens barrel, a mounting pin on a picture projector apparatus for securing said mounting thereon, a plate at and lateral to one end of the barrel and provided with mounting pin receiving openings, a latch bar, slot and screw connections between said latch bar and said plate, said latch bar having an opening formed therein adapted to register with one of the mounting pin receiving openings, and spring means between said plate and said latch bar for moving said bar in a direction to engage the latch bar in a grooved head formed in said mounting pin projected through said one of said mounting pin openings, said latch bar at one end thereof and said plate at one edge thereof providing laterally extending finger lugs adapted to be grasped between the fingers of a hand to move the latch bar relative to said plate.

ELLIS WELLINGTON D'ARCY.

REFERENCES CITED

The following references are of record in the file of this patent:

UNITED STATES PATENTS

| Number | Name | Date |
| --- | --- | --- |
| 1,193,998 | Proszynski | Aug. 8, 1916 |
| 1,282,293 | Roebuck | Oct. 22, 1918 |
| 1,962,356 | Mihalyi | June 12, 1934 |
| 1,991,861 | May | Feb. 19, 1935 |
| 2,380,613 | Ress | July 31, 1945 |